US011908647B2

(12) United States Patent
Haba et al.

(10) Patent No.: US 11,908,647 B2
(45) Date of Patent: Feb. 20, 2024

(54) CIRCUIT BREAKER

(71) Applicant: ASTOTEC AUTOMOTIVE GMBH, Hirtenberg (AU)

(72) Inventors: Dietmar Haba, Baden (AT); Ludwig Marker, Grillenberg (AT); Kurt Aigner, Vienna (AT)

(73) Assignee: ASTOTEC AUTOMOTIVE GMBH, Hirtenberg (AT)

( * ) Notice: Subject to any disclaimer, the term of this patent is extended or adjusted under 35 U.S.C. 154(b) by 228 days.

(21) Appl. No.: 17/619,582

(22) PCT Filed: Jul. 10, 2020

(86) PCT No.: PCT/AT2020/060268
§ 371 (c)(1),
(2) Date: Jan. 10, 2022

(87) PCT Pub. No.: WO2021/007604
PCT Pub. Date: Jan. 21, 2021

(65) Prior Publication Data
US 2022/0384130 A1 Dec. 1, 2022

(30) Foreign Application Priority Data
Jul. 12, 2019 (AT) .................................. 50635/2019

(51) Int. Cl.
*H01H 39/00* (2006.01)
*H01H 9/30* (2006.01)

(52) U.S. Cl.
CPC ............ *H01H 39/006* (2013.01); *H01H 9/30* (2013.01)

(58) Field of Classification Search
CPC .......... H01H 39/006; H01H 9/30; H01H 9/34; H01H 9/302; H01H 2009/305
See application file for complete search history.

(56) References Cited

U.S. PATENT DOCUMENTS

| | | | | |
|---|---|---|---|---|
| 3,214,552 | A | 10/1965 | Leeds | |
| 4,224,487 | A * | 9/1980 | Simonsen ............ | H01H 39/006 200/61.08 |
| 5,990,572 | A | 11/1999 | Yasukani | |
| 7,222,561 | B2 | 5/2007 | Brede | |
| 9,236,208 | B2 * | 1/2016 | Ukon .................. | H01H 39/006 |
| 9,324,522 | B2 * | 4/2016 | Nakamura ........... | H01H 39/006 |
| 10,424,448 | B2 | 9/2019 | Goldman | |
| 10,622,176 | B2 | 4/2020 | Volkmann | |

FOREIGN PATENT DOCUMENTS

| | | |
|---|---|---|
| DE | 202018100728 U | 3/2018 |

* cited by examiner

*Primary Examiner* — Kyung S Lee
(74) *Attorney, Agent, or Firm* — Andrew Wilford

(57) ABSTRACT

A disconnect has a housing defining a cavity, a busbar fixed in the housing and extending through the cavity, a piston movable in the cavity past the piston for breaking a piece out of the busbar, and a plurality of metallic filter elements exposed in the cavity below the busbar and electrically connecting with the piece on activation of the disconnect. An igniter displaces the piston in the cavity into engagement with and past the busbar so as to break the piece out of busbar and displace it past the filter elements such that an arc created by breaking out the piece is drawn by the piece away from the busbar and energy of the arc heats and is dissipated in the filter elements.

12 Claims, 3 Drawing Sheets

[Fig. 1]
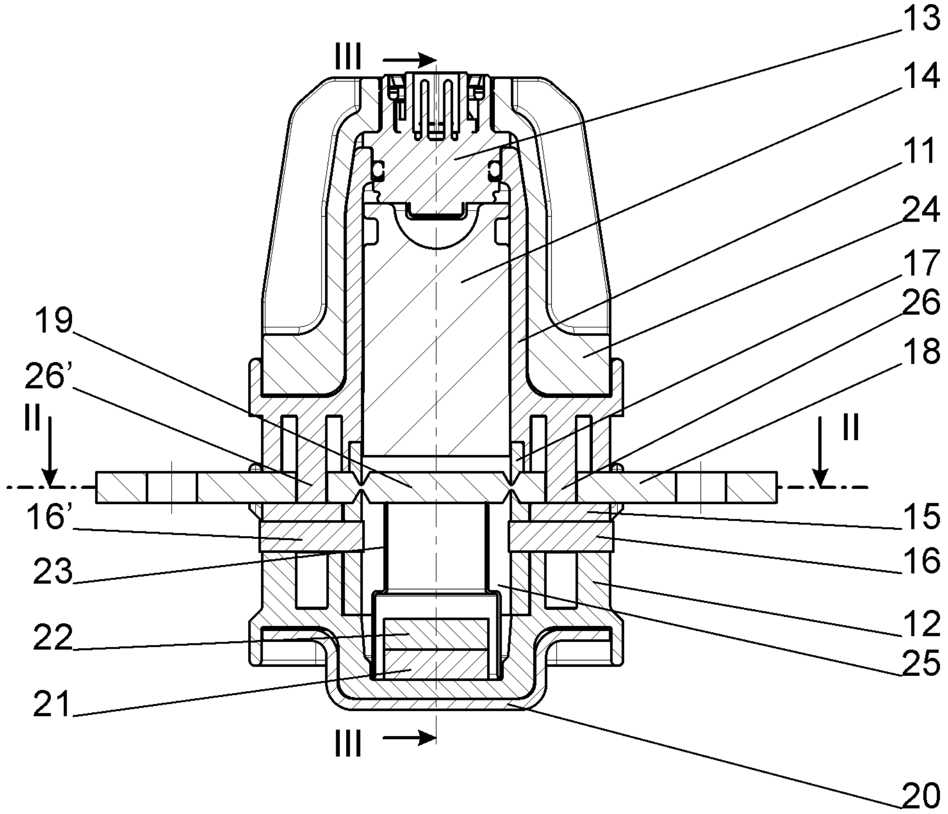
[Fig. 2]
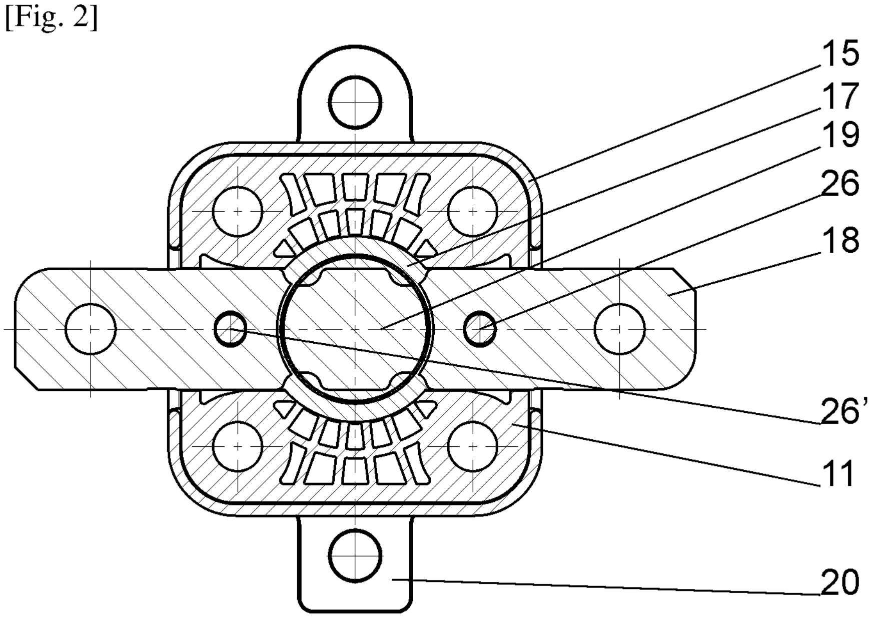

[Fig. 3]
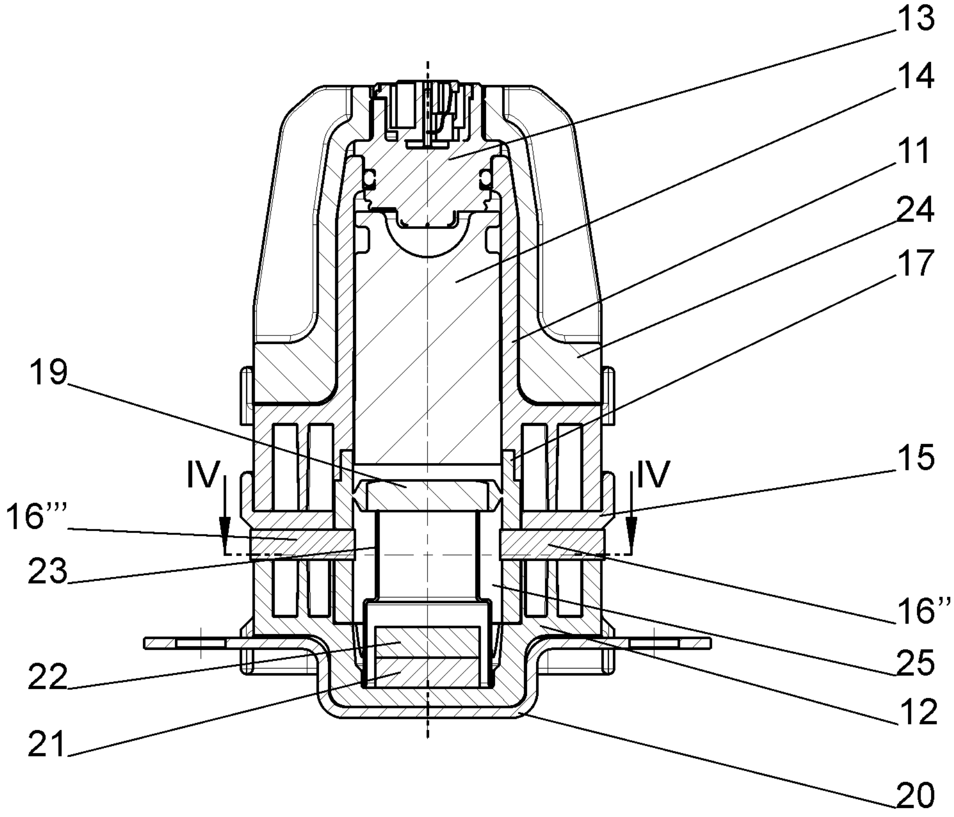
[Fig. 4]
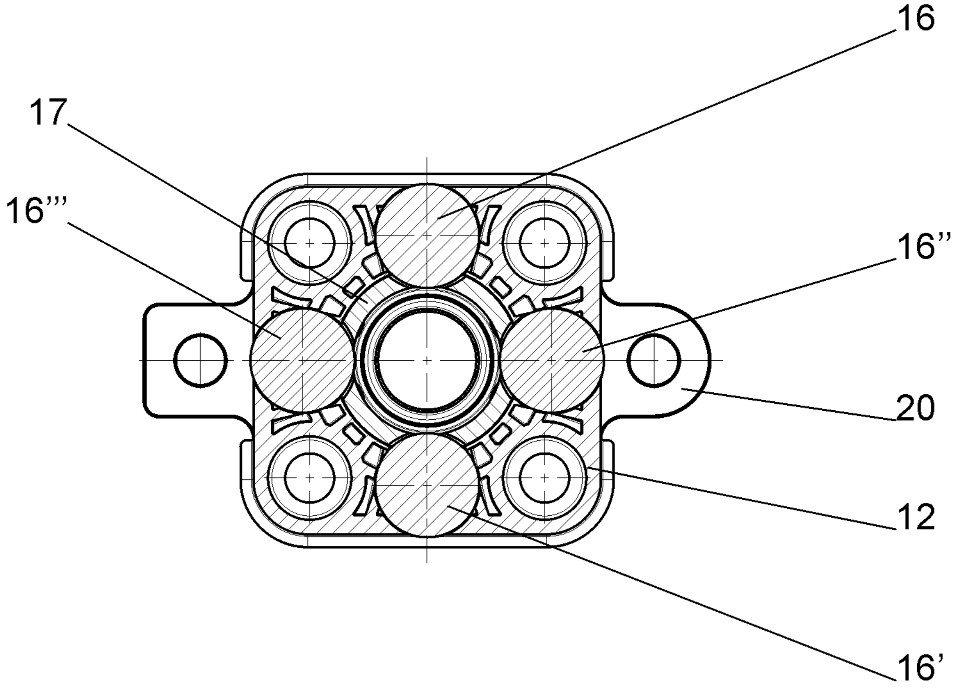

[Fig. 5]
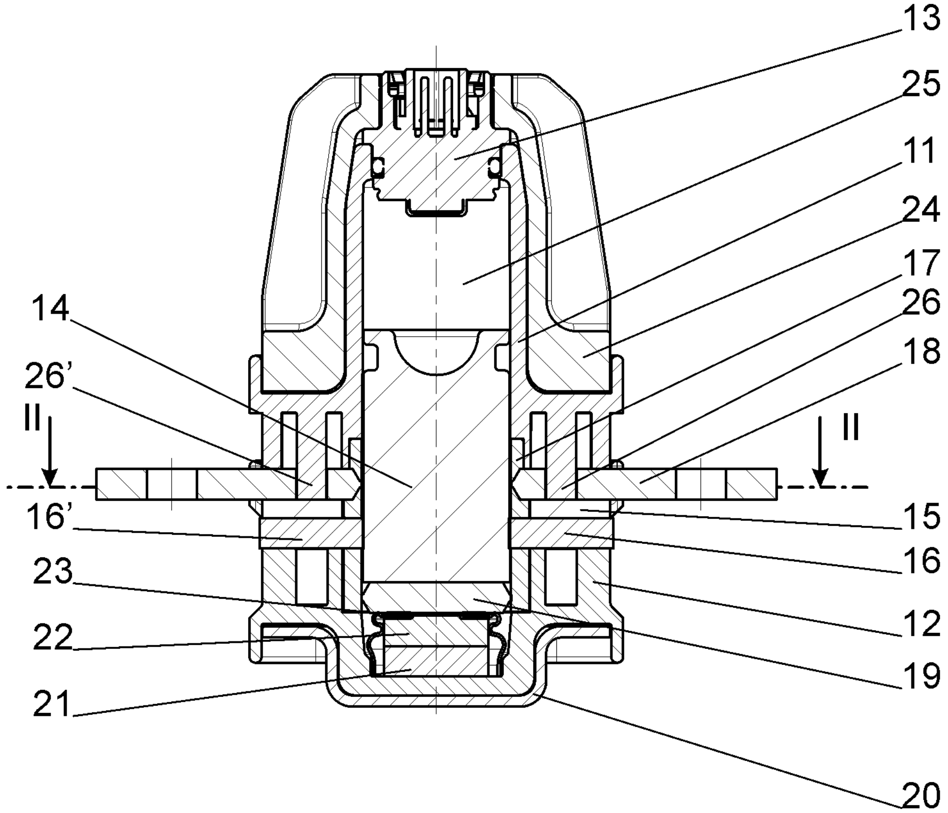
[Fig. 6]
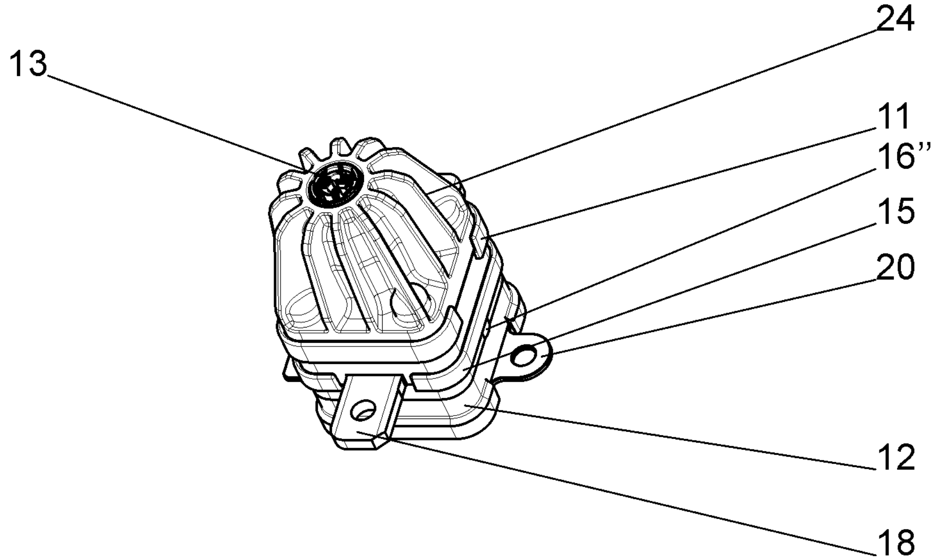

CIRCUIT BREAKER

CROSS REFERENCE TO RELATED APPLICATIONS

This application is the US-national stage of PCT application PCT/AT2020/060268 filed 10 Jul. 2020 and claiming the priority of Austrian patent application A50635/2019 itself filed 12 Jul. 2019.

TECHNICAL FIELD

The present invention relates to a disconnect having a busbar and a piston movable in a cavity through which the busbar passes for breaking a piece out of the busbar, where the disconnect has at least one metallic filter element.

PRIOR ART

Such a disconnect is known from DE 102018125059 [U.S. Pat. No. 10,622,176]. It has blow-out passages for the arc produced during current interruption and in which metallic filter elements can be present that cool the plasma of the arc and thus contribute to cutting of the arc. The blow-out passages connect the cavity, in which the piston moves and in which the arc is formed, to the environment of the disconnect. The filter material is located only inside the blow-out passages, i.e. the region of the blow-out passages adjoining the cavity is free of filter material.

DESCRIPTION OF THE INVENTION

The object of the present invention is to further improve such a disconnect so that its external effect is further reduced.

This object is achieved according to the invention by a disconnect of the above-described type in that the filter element extends as far as the cavity. This ensures that the separated piece contacts the at least one filter element when tripped. After separation of the piece from the conductor, an arc is formed between the end of the busbar and the piece. As a result of the contact of the filter element by the piece, the arc extends from the fractured ends of the busbar to the metallic filter element at a further distance from the piece, as a result of which the energy from the electrical inductance is converted into heat dissipated in the filter. With a suitable design, there is only a moderate pressure rise in the disconnect and thus practically no external effect. Surprisingly, the external effect is thus almost completely prevented even if no additional extinguishing agent is present in the disconnect.

The filter element is preferably electrically insulated from the busbar when not tripped. In this way, when the disconnect is tripped, a galvanic isolation of the two ends of the busbar is ensured and an electrical connection between the busbar and filter elements is produced only by the arc.

According to a preferred embodiment, metallic filter elements are located on both sides of the piston below the busbar so that the piece electrically connects the filter elements when tripped. The current thus flows during the current-interruption process via both filter elements and the piece. The energy from the system inductance is thus dissipated in two filter elements.

After being tripped, the piece can remain between or leave contact with the filter elements. In order to ensure galvanic isolation when tripped, remaining between the filter elements is expedient only if at least one filter element is electrically insulated from the busbar when not tripped.

In order to improve the extinguishing effect, an extinguishing agent is additionally provided in the disconnect according to an embodiment of the invention. The extinguishing agent is preferably a silicon compound, in particular a silicone oil or a silicone-containing grease.

It is advantageous if recesses are provided in the housing between the busbar and the filter elements. Such recesses in the housing prevent the arc from being squeezed by the separating punch, so that conversion of the energy of the system inductance into waste heat in the filter elements is not impaired.

A particular advantage of the invention is that the housing can be sealed because the pressure rise is only small. As a result of the sealing, the external effect is reduced once more. The filter elements can thus also be insulated from the outside world. The filter elements then act only as a thermal sink. This results in a further advantage that no external arcs can form from the filter elements.

If at least one further filter element is provided on the side of the busbar, the cooling effect of the filter elements is further intensified.

The filter element or the filter elements are preferably formed from stainless steel, in particular in the form of a metal-mesh mass or fabric. In the case of a metal nonwoven, the contact of the filter elements by the piece can be realized particularly easily. The metal fabric can project slightly into the cavity and is either elastically pushed back or sheared off by the punched-out piece. In both cases, good contact results.

Disconnects of this type can reliably interrupt currents up to 23 kA and voltages up to 1000V.

BRIEF DESCRIPTION OF THE DRAWINGS

The present invention is explained in more detail with reference to the accompanying drawings where:

FIG. 1 is a longitudinal section through a disconnect according to the invention in a non-tripped state in a plane containing the busbar;

FIG. 2 is a section along the line II-II of FIG. 1;

FIG. 3 is a section along the line of III-III FIG. 1;

FIG. 4 is a section along the line IV-IV of FIG. 3;

FIG. 5 is a view like FIG. 1 of the disconnect where the disconnect in the tripped state; and FIG. 6 is a perspective view of the disconnect.

BEST MODE FOR CARRYING OUT THE INVENTION

The housing of the disconnect is formed by an upper part 11 and a lower part 12. The lower part 12 is supported by a lower support ring 20 that holds and reinforces the lower part 12. The upper part 11 and the lower part 12 are fixed to each other, for example screwed together. The upper part 11 is reinforced by a reinforcing cap 24. A busbar 18 extends between the upper part 11 and the lower part 12. In order for the busbar 18 to be securely fixed in the housing even after being tripped, it has on both sides holes into which projections 26 and 26' of the upper part engage. The busbar 18 is thus fixed in a solidly in place.

In the upper part there is an igniter 13 that, when ignited, applies pressure to a piston 14. This piston 14 is movable in a cavity 25. This cavity 25 is located partially in the upper part 11 and partially in the lower part 12. To start with, the piston 14 is completely in the upper part 11, that is to say above the busbar 18. If pressure pushes it downward, it moves at least partially into the cavity 25 in the lower part (see FIG. 5), punching a piece 19 out of the busbar 18.

Two filter elements 16 and 16' are provided below the busbar 18. An insulating plate 15 therebetween ensures that there is no electrical contact between the busbar 18 and the filter elements 16 and 16'.

The predetermined fracture lines formed by thickness reductions of the busbar 18 are overmolded by an encapsulation 17 that forces the arc produced during the current interruption to only extend from the predetermined fracture lines to the piece 19. In contrast, in the known disconnects, the arc extends from the lower face of the busbar 18.

A further filter elements 21 and 22 that serve as a stop and as a heat sink, are located at the lower end of the cavity 25. A braking element 23 is provided above this or around the latter and slows downward movement of the piece 19 or piston 14, thereby affecting the change in current and the induced voltage resulting therefrom.

Further filter elements 16" and 16'" (see FIGS. 3 and 4) serve as an additional heat sink and are located laterally next to the busbar 18.

The disconnect according to the invention functions as follows: First, short-gap arcs form between the busbar 18 and the piece 19. Then, the piece 19 moves downward and these arcs are stretched. This elongation takes place first along the insulating plate 15, then along the metallic filter elements 16 and 16'. The arc then enters the filter elements 16 and 16' and the flow thus passes through the filter elements 16 and 16' to the piece 19.

The purpose is to use the filter elements 16 and 16' as load resistors and to thereby convert the inductive energy of the current in the filter elements 16 and 16' into heat.

The piece 19 stops moving downward at the level of the lower edge of the filter elements 16 and 16' and remains in contact with the filter elements 16 and 16'. Since the filter elements 16 and 16' are galvanically separated from the residues of the busbar 18 by the insulating plate 15, the circuit is nevertheless reliably separated after the arcs have been extinguished. However, as in the exemplary embodiment, the piece 19 can also travel further downwards.

In this case, after the piece 19 has left the filter elements 16 and 16' again, two further arcs are formed that are cut to length by the movement of the board 19.

If the inductive energy is consumed, the arcs are extinguished by clamping between the overmolding 17 and the piston 14. In this state, there is no conductive connection between the two connections of the busbar 18.

The filter elements can have a connection to the surroundings, as shown in the illustrated embodiment, and can thus be used for filtering and cooling an escaping excess pressurized gases. In a particularly preferred embodiment, however, they have no connection to the outside in order to reduce the external effect. The overpressure is then absorbed only by the filter elements 16, 16', 16" and 16'" and the further filter elements 21 and 22.

The invention claimed is:

1. A disconnect comprising:

a housing defining a cavity;

a busbar fixed in the housing and extending through the cavity;

a piston movable in the cavity past the piston for breaking a piece out of the busbar;

a plurality of metallic filter elements exposed in the cavity below the busbar and electrically connecting with the piece on activation of the disconnect; and means for displacing the piston in the cavity into engagement with and past the busbar so as to break the piece out of busbar and displace it past the filter elements such that an arc created by breaking out the piece is drawn by the piece away from the busbar and energy of the arc heats and is dissipated in the filter elements.

2. The disconnect according to claim 1, further comprising:

dielectric insulation between the filter element and the busbar when the disconnect is not tripped and the piston has not broken the piece out of the busbar.

3. The disconnect according to claim 1, wherein the filter elements are metallic and on both sides of the piston below the busbar, so that the piece electrically connects the filter elements when the disconnect is tripped.

4. The disconnect according to claim 3, wherein the piece remains between or leaves the filter elements after the disconnect has been tripped.

5. The disconnect according to claim 1, wherein an extinguishing agent is additionally provided in the disconnect.

6. The disconnect according to claim 5, wherein the extinguishing agent is a silicon compound.

7. The disconnect according to claim 6, wherein the extinguishing agent is a silicone oil or a silicone-containing grease.

8. The disconnect according to claim 1, wherein the housing is formed with recesses opening into the cavity in the housing between the busbar and the filter elements.

9. The disconnect according to claim 1, wherein the housing is sealed.

10. The disconnect according to claim 1, wherein the filter elements are insulated from the outside environment.

11. The disconnect according to claim 1, wherein further filter elements flank the busbar.

12. The disconnect according to claim 1, wherein the filter element is formed of stainless-steel filaments.

* * * * *